United States Patent
Song et al.

(10) Patent No.: US 12,344,701 B2
(45) Date of Patent: Jul. 1, 2025

(54) MOISTURE-CURABLE POLYURETHANE COMPOSITION WITH REDUCED SURFACE TACKINESS

(71) Applicant: SIKA TECHNOLOGY AG, Baar (CH)

(72) Inventors: Zhiyong Song, Suzhou (CN); Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 735 days.

(21) Appl. No.: 17/631,938

(22) PCT Filed: May 26, 2020

(86) PCT No.: PCT/CN2020/092281
§ 371 (c)(1),
(2) Date: Feb. 1, 2022

(87) PCT Pub. No.: WO2021/027357
PCT Pub. Date: Feb. 18, 2021

(65) Prior Publication Data
US 2022/0363803 A1    Nov. 17, 2022

(30) Foreign Application Priority Data
Aug. 15, 2019    (WO) ............... PCT/CN2019/100767

(51) Int. Cl.
| | |
|---|---|
| *C08G 18/10* | (2006.01) |
| *C08G 18/12* | (2006.01) |
| *C08G 18/30* | (2006.01) |
| *C08G 18/32* | (2006.01) |
| *C08G 18/38* | (2006.01) |
| *C08G 18/48* | (2006.01) |
| *C08L 75/08* | (2006.01) |

(52) U.S. Cl.
CPC .......... *C08G 18/307* (2013.01); *C08G 18/12* (2013.01); *C08G 18/3256* (2013.01); *C08G 18/3819* (2013.01); *C08G 18/4829* (2013.01); *C08G 18/4841* (2013.01); *C08L 75/08* (2013.01); *C08G 2190/00* (2013.01)

(58) Field of Classification Search
CPC .. C08G 18/307; C08G 18/12; C08G 18/3256; C08G 18/3819; C08G 18/4829; C08G 18/4841; C08G 2190/00; C08G 18/762; C08L 75/08
See application file for complete search history.

(56) References Cited

U.S. PATENT DOCUMENTS

| | | | |
|---|---|---|---|
| 5,194,488 A * | 3/1993 | Piestert | C08G 18/10 |
| | | | 524/703 |
| 7,625,993 B2 | 12/2009 | Burckhardt | |
| 8,252,859 B2 | 8/2012 | Burckhardt | |
| 2008/0199621 A1* | 8/2008 | Burckhardt | C08G 18/10 |
| | | | 524/542 |
| 2009/0099333 A1* | 4/2009 | Burckhardt | C08G 18/089 |
| | | | 548/546 |

(Continued)

FOREIGN PATENT DOCUMENTS

| | | |
|---|---|---|
| CN | 1882627 A | 12/2006 |
| CN | 101379106 A | 3/2009 |

(Continued)

OTHER PUBLICATIONS

Aug. 11, 2020 International Search Report issued in International Patent Application No. PCT/CN2020/092281.

(Continued)

*Primary Examiner* — Katarzyna I Kolb
(74) *Attorney, Agent, or Firm* — Oliff PLC

(57) ABSTRACT

A moisture-curable composition, including: a) at least one polyurethane polymer P having isocyanate groups; b) at least one blocked polyamine BA having blocked, hydrolytically activatable amino groups; and c) at least one monoamine MA of formula (V),

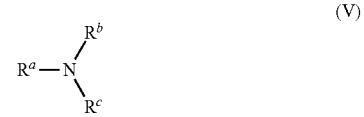

where $R^a$ represents a linear, cyclic, or branched alkyl or alkenyl radical or optionally substituted aryl radical with 1 to 12 C atoms and optionally including ether oxygen atoms; $R^b$ and $R^c$ either independently represent a rest $R^a$ or a hydrogen atom, where at least one of $R^b$ and $R^c$ is a hydrogen atom, or $R^b$ and $R^c$ together with the N atom of monoamine MA form an aldimine group that under influence of water hydrolyzes to a aldehyde and an amine $R^a$—$NH_2$; wherein polymer P is the reaction product of 2,4- and/or 2,6-toluylene diisocyanate (TDI) and at least one polyol, wherein the polyol has an average functionality of >2.

16 Claims, No Drawings

(56) References Cited

U.S. PATENT DOCUMENTS

| | | | | |
|---|---|---|---|---|
| 2012/0045652 A1* | 2/2012 | Zahn | .................. | C08G 18/10 |
| | | | | 156/331.7 |
| 2015/0353797 A1* | 12/2015 | Kislig | .................. | C09D 175/08 |
| | | | | 52/309.1 |
| 2015/0361299 A1* | 12/2015 | Byrne | .................. | C08G 18/3256 |
| | | | | 524/590 |
| 2016/0024318 A1* | 1/2016 | Byrne | .................. | C08G 18/10 |
| | | | | 554/107 |

FOREIGN PATENT DOCUMENTS

| | | | |
|---|---|---|---|
| CN | 101484491 | A | 7/2009 |
| CN | 101883753 | A | 11/2010 |
| CN | 101903432 | A | 12/2010 |
| CN | 104884492 | A | 9/2015 |
| EP | 1 770 107 | A1 | 4/2007 |
| EP | 2 108 669 | A1 | 10/2009 |
| EP | 2236535 | A1 | 10/2010 |
| EP | 2 220 034 | B1 | 12/2015 |
| EP | 3315528 | A1 | 5/2018 |
| WO | 2017/009310 | A1 | 1/2017 |
| WO | 2017/108834 | A1 | 6/2017 |
| WO | 2018/005114 | A1 | 1/2018 |

OTHER PUBLICATIONS

Aug. 11, 2020 Written Opinion issused in International Patent Application No. PCT/CN2020/092281.

* cited by examiner

MOISTURE-CURABLE POLYURETHANE COMPOSITION WITH REDUCED SURFACE TACKINESS

TECHNICAL FIELD

The invention relates to the field of moisture-curable polyurethane compositions and the use thereof, in particular as low modulus sealants.

BACKGROUND OF THE INVENTION

One-component compositions based on moisture-reactive polyurethanes with free isocyanate groups have been used as adhesives, sealants and coating materials for a long time. Such systems are easy to use since mixing operations are not required and open times allow for a comfortable application process both in construction and in do-it-yourself applications.

In particular for joint sealant applications, such one-component polyurethane compositions in most cases need to have certain properties in the cured state in order to fulfill the task efficiently. On one hand, appropriate adhesion on the joint substrates is required, on the other hand, the sealant material needs to have sufficient elasticity including a low elastic modulus in order to be able to compensate for substrate movement without breaking the sealant body.

Commonly, such joint sealants require an elastic modulus of less than about 0.7 MPa in the range of 0.5-25% elongation, and a modulus of less than about 0.35 MPa in the range of 0.5-100% elongation in the stress-strain test according to DIN 53504.

One major problem associated with such low-modulus moisture-curable one-component polyurethane compositions is an inherent surface tackiness that these compositions exhibit after curing. This phenomenon is normally more pronounced the lower the elastic modulus of the composition is. Surface tackiness leads to esthetically displeasing surfaces, e.g. due to dirt or dust accumulation. Especially for one-component polyurethane composition comprising latent, water-activatable hardeners having blocked amino groups, this phenomenon is known and especially prominent in low elastic modulus sealants. The use of blocked amines in moisture-curable compositions based on conventional isocyanate group-containing polymers is known, for example from U.S. Pat. No. 7,625,993 or 8,252,859.

Strategies to overcome this problem are known in the field. For example, EP3315528 (Sika Technology AG) uses crystalline, monofunctional alcohols to reduce the surface tackiness of a polyurethane-based hotmelt adhesive. However, for low elastic modulus sealants, this approach is not sufficient.

There is therefore a need for one-component polyurethane compositions useful as elastic sealants that exhibit not only very low elastic modulus, but also low surface tackiness.

SUMMARY OF THE INVENTION

The object of the present invention is to provide a one-component polyurethane composition with particularly low modulus and thus suitable as joint sealant with especially high movement capacity, and at the same time exhibiting exceptionally low surface tackiness.

The composition according to the present invention is especially suitable for sealing joints or surfaces, but may also be employed as, in particular elastic, adhesive or coating.

Surprisingly, it has been found that by adding defined amounts of at least one monofunctional amine to a composition comprising an isocyanate-functional polyurethane polymer and a latent amine hardener according to claim 1, the above object can be achieved. The compositions according to the present invention exhibit an elastic modulus of less than about 0.7 MPa in the range of 0.5-25% elongation, and an elastic modulus of less than about 0.35 MPa in the range of 0.5-100% elongation in the stress-strain test according to DIN 53504. Furthermore, their surface tackiness is significantly reduced while the low elastic modulus is maintained, compared to compositions not comprising said monofunctional amine or comprising other additives from the state of the art, such as alcohols.

According to another aspect of the present invention, a method for sealing a joint is provided.

DETAILED DESCRIPTION OF THE INVENTION

Substance names beginning with "poly", such as polyamine, polyol or polyisocyanate, designate substances which formally contain, per molecule, two or more of the functional groups occurring in their names. For instance, a polyol refers to a compound having at least two hydroxyl groups. A polyether refers to a compound having at least two ether groups. A "primary polyamine" refers to a compound having at least two primary amino groups. Accordingly, substances beginning with "mono", such as monoamine, formally contain only one of the respective functional group, such as amine.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

The term "(meth)acrylic" designates methacrylic or acrylic. Accordingly, the term "(meth)acrylate" designates methacrylate or acrylate.

An "aromatic isocyanate" or "aliphatic isocyanate" refers to an isocyanate wherein the isocyanate groups are bonded directly to an aromatic or aliphatic carbon atom. Accordingly, isocyanate groups of this kind are referred to as "aromatic isocyanate groups" or "aliphatic isocyanate groups".

The term "nominal functionality" (f) means the average or actual functionality of a given substance or polymer with regards to a specific functional group. For example, a pure polyether diol has a hydroxyl nominal functionality of f=2. Likewise, glycerin has a nominal functionality of 3 with regards to hydroxyl groups.

The term "viscosity" refers to the dynamic viscosity or shear viscosity which is determined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

The term "shelf life" designates a time period after which a dispersion adhesive composition has substantially coagulated, separated or settled such that it cannot be readily applied to a surface of a substrate as homogeneous, uniform film or bead.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "room temperature" (abbreviated "RT") designates a temperature of 23° C.

The term "standard pressure" designates an absolute pressure of 1 bar.

The present invention relates in a first aspect of the invention to moisture curable composition comprising
  a) at least one polyurethane polymer P having isocyanate groups;
  b) at least one blocked polyamine BA having blocked, hydrolytically activatable amino groups; and
  c) at least one monoamine MA of formula (V),

where
  $R^a$ represents a linear, cyclic, or branched alkyl or alkenyl radical or optionally substituted aryl radical with 1 to 12 C atoms, preferably 2 to 10 C atoms, more preferably 3 to 8 C atoms, and optionally comprising ether oxygen atoms; $R^b$ and $R^c$ either independently represent a rest $R^a$ or a hydrogen atom, with the provisio that at least one of $R^b$ and $R^c$ is a hydrogen atom, or $R^b$ and $R^c$ together with the N atom of monoamine BA form an aldimine group that under influence of water hydrolyzes to a aldehyde and an amine $R^a$—$NH_2$;
wherein
  polymer P is the reaction product of 2,4- and/or 2,6-toluylene diisocyanate (TDI) and at least one polyol, wherein the polyol has an average functionality of >2; and
  wherein the amount of said monoamine MA in the composition is between 0.2 and 25 weight parts per 100 weight parts of said polymer P.

Polyurethane Polymer P Having Isocyanate Groups

The composition comprises at least one polyurethane polymer P having isocyanate groups, wherein polymer P is the reaction product of 2,4- and/or 2,6-toluylene diisocyanate (TDI) and at least one polyol, wherein the polyol has an average functionality of >2.

It is necessary that TDI is used as polyisocyanate for the production of polymer P. Other aromatic polyisocyanates, such as diphenylmethane 4,4'- or 2,4'- or 2,2'-diisocyanate or any mixtures of these isomers (MDI), or aliphatic polyisocyanates, such as 1-isocyanato-3,3,5-trimethyl-5-isocyanatomethyl-cyclohexane (IPDI) do not lead to the desired effect of the invention.

Polyurethane polymer P is in particular obtained from the reaction of at least one polyol with a superstoichiometric amount of MDI. The reaction is preferably conducted with exclusion of moisture at a temperature in the range from 50 to 160° C., optionally in the presence of suitable catalysts. The NCO/OH ratio is preferably in the range from 1.3/1 to 2.5/1. The polyisocyanate remaining after the conversion of the OH groups in the reaction mixture, especially monomeric diisocyanate, can be removed if required, especially by means of distillation, which may be preferable in the case of a high NCO/OH ratio. The polyurethane polymer obtained preferably has a content of free isocyanate groups in the range from 0.5% to 10% by weight, especially 1% to 5% by weight, more preferably 1% to 3% by weight. The polyurethane polymer can optionally be prepared with additional use of plasticizers or solvents, in which case the plasticizers or solvents used do not contain any groups reactive toward isocyanates.

Suitable polyols for the synthesis of isocyanate-functional polymers suitable as polymers P are commercial polyols or mixtures thereof, especially
  polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having multiple OH or NH groups, for example 1,2-ethanediol, 1,2- or 1,3-propanediol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, 1,3- or 1,4-cyclohexanedimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those with styrene-acrylonitrile particles (SAN) or polyurea or polyhydrazodicarbonamide particles (PHD).

Preferred polyether polyols are polyoxypropylenediols or polyoxypropylenetriols, or what are called ethylene oxide-terminated (EO-endcapped) polyoxypropylenediols or -triols. The latter are mixed polyoxyethylene-polyoxypropylene polyols which are especially obtained in that polyoxypropylenediols or -triols, on conclusion of the polypropoxylation reaction, are further alkoxylated with ethylene oxide and hence ultimately have primary hydroxyl groups.

Preferred polyether polyols have a degree of unsaturation of less than 0.02 meq/g, especially less than 0.01 meq/g.

Polyester polyols, also called oligoesterols, prepared by known processes, especially the polycondensation of hydroxycarboxylic acids or lactones or the polycondensation of aliphatic and/or aromatic polycarboxylic acids with di- or polyhydric alcohols. Preference is given to polyester diols from the reaction of dihydric alcohols, such as, in particular, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, with organic dicarboxylic acids or the anhydrides or esters thereof, such as, in particular, succinic acid, glutaric acid, adipic acid, suberic acid, sebacic acid, dodecanedicarboxylic acid, maleic acid, fumaric acid, phthalic acid, isophthalic acid, terephthalic acid or hexahydrophthalic acid or mixtures of the aforementioned acids, or polyester polyols formed from lactones such as, in particular, ε-caprolactone. Particular preference is given to polyester polyols formed from adipic acid or sebacic acid or dodecanedicarboxylic acid and hexanediol or neopentyl glycol.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by oxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can, for example, be derivatized to hydroxy fatty acid esters by hydroformylation and hydrogenation.

Polyhydrocarbon polyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers as produced, for example, by Kraton Polymers; polyhydroxy-functional polymers of dienes, especially of 1,3-butadiene, which can especially also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers as preparable, for example, from epoxides or amino alcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Also especially suitable are mixtures of polyols. In case of a mixture, the average functionality of the polyol is calculated as a total average using the average functionality of the individual polyols. It is thus possible to use a mixture of polyols with a functionality of ≤2 as long as sufficient amounts of polyols with a functionality of >2 are contained in the mixture such that the overall average functionality is >2.

If the average functionality of all polyols is ≤2, the desired technical effect cannot be obtained in a sufficient manner.

In preferred embodiments, the overall average OH functionality of the polyols used for the production of polymer P is >2.25, especially >2.5, in particular >2.75.

In preferred embodiments of the moisture-curable composition according to the present invention, the polyol or polyols used for the synthesis of polymer P has or have an average OH-functionality of between 2.1 and 3.5, preferably between 2.5 and 3, and/or said polymer P is prepared from said polyol and TDI using a molar ratio of NCO groups to OH groups of between 1.8 and 2.2.

Regarding the polyols, preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Most preferred are polyether polyols, especially polyoxypropylenedi- or triols or ethylene oxide-terminated polyoxypropylenedi- or triols.

Preference is given to polyols having an average molecular weight in the range from 400 to 20'000 g/mol, preferably from 1'000 to 15'000 g/mol.

Preference is given to polyols having an average OH functionality in the range from 2.1 to 3.5, preferably from 2.5 to 3.

Preference is given to polyols that are liquid at room temperature.

In the preparation of a polyurethane polymer containing isocyanate groups, it is also possible to use fractions of di- or polyfunctional alcohols, especially 1,2-ethanediol, 1,2-propanediol, 1,3-propanediol, 2-methyl-1,3-propanediol, 1,2-butanediol, 1,3-butanediol, 1,4-butanediol, 1,3-pentanediol, 1,5-pentanediol, 3-methyl-1,5-pentanediol, neopentyl glycol, dibromoneopentyl glycol, 1,2-hexanediol, 1,6-hexanediol, 1,7-heptanediol, 1,2-octanediol, 1,8-octanediol, 2-ethyl-1,3-hexanediol, diethylene glycol, triethylene glycol, dipropylene glycol, tripropylene glycol, 1,3- or 1,4-cyclohexanedimethanol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols such as, in particular, xylitol, sorbitol and mannitol, or sugars such as, in particular, sucrose, or alkoxylated derivatives of the alcohols mentioned or mixtures of the alcohols mentioned.

The polyurethane polymer containing isocyanate groups suitable as polymer P preferably has an average molecular weight $M_n$ in the range from 1'500 to 20'000 g/mol, especially 2'000 to 15'000 g/mol.

It is preferably liquid at room temperature.

The amount of polymer P within the composition is preferably in the range of between 10 and 50 wt.-%, preferably between 15 and 40 wt.-%, based on the total composition.

Monoamine MA

The composition comprises at least one monoamine MA of formula (I),

(X)

where
- $R^a$ represents a linear, cyclic, or branched alkyl or alkenyl radical or optionally substituted aryl radical with 1 to 12 C atoms, preferably 2 to 10 C atoms, more preferably 3 to 8 C atoms, and optionally comprising ether oxygen atoms;
- $R^b$ and $R^c$ either independently represent a rest $R^a$ or a hydrogen atom, with the provisio that at least one of $R^b$ and $R^c$ is a hydrogen atom, or $R^b$ and $R^c$ together with the N atom of monoamine MA form an aldimine group that under influence of water hydrolyzes to a aldehyde and an amine $R^a$—$NH_2$.

The amount of said monoamine MA in the composition is between 0.2 and 25, preferably between 0.3 and 10, more preferably between 0.4 and 5 weight parts per 100 weight parts of said polymer P.

In preferred embodiments of the composition, $R^b$ and $R^c$ independently represent a rest $R^a$ or a hydrogen atom, with the provisio that at least one of $R^b$ and $R^c$ is a hydrogen atom.

In particularly preferred embodiments of the composition $R^b$ is a rest $R^a$ and $R^c$ is a hydrogen atom. In this embodiment, $R^a$ and $R^b$ preferably are, independent of one another, a linear, cyclic, or branched alkyl or alkenyl radical or optionally substituted aryl radical with 1 to 12 C atoms, preferably 2 to 10 C atoms, more preferably 3 to 8 C atoms. Most preferably, $R^a$ and $R^b$ are a linear or branched alkyl radical with 3 to 8 C atoms.

In other preferred embodiments of the composition, $R^b$ and $R^c$ together with the N atom of monoamine MA form an aldimine group that under influence of water hydrolyzes to a aldehyde and an amine $R^a$—$NH_2$. Suitable aldehydes are the same as discussed further below for the blocked polyamine BA. This embodiment is especially preferably when used in combination with non-dried ingredients, such as fillers. In this case, the aldimine made from monoamine MA may act as internal drying agent while releasing monoamine MA. In this embodiment, $R^b$ and $R^c$ are a hydrogen atom and $R^a$ represents a linear, cyclic, or branched alkyl or alkenyl radical or optionally substituted aryl radical with 1 to 12 C atoms, preferably 2 to 10 C atoms, more preferably 3 to 8 C atoms, and optionally comprising ether oxygen atoms. Preferably here, $R^a$ is a linear or branched alkyl radical with 3 to 8 C atoms.

Polyamine BA

The composition comprises at least one at least one blocked polyamine BA having blocked, hydrolytically activatable amino groups.

The role of said blocked polyamine BA is to provide a latent hardener for the isocyanate-functional polymer P. Under influence of moisture, e.g. from air, said blocked polyamine BA hydrolyses and releases an amine cross-linker that readily reacts with the isocyanate-groups of polymer P and forms a cross-linked structure. Polyurethane curing using such latent hardeners is well known in the field and leads to controlled, bubble-free curing of the polyurethane composition.

In preferred embodiments of the moisture-curable composition according to the present invention, said blocked polyamine BA and the polymer P having isocyanate groups are present in the curable composition in such an amount that the ratio between the blocked amino groups and the isocyanate groups is from 0.1 to 1.1, preferably from 0.2 to 1.1, especially preferred from 0.3 to 1.0.

The blocked amine used as a curing aid in the form of polyamine BA preferably has at least one aldimino group or oxazolidino group. These blocked amino groups together with isocyanate groups to the exclusion of moisture are particularly storage-stable.

Suitable as a blocked amine is in particular a bis-oxazolidine, in particular a bis-oxazolidine of the formula (Ia) or (Ib),

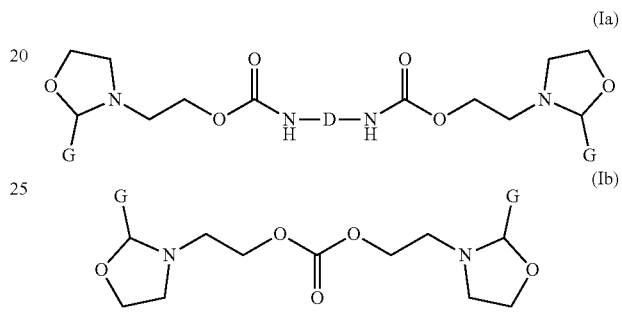

wherein
- D is a divalent hydrocarbon radical having 6 to 15 carbon atoms, in particular representing 1,6-hexylene or (1,5,5-trimethylcyclohexan-1-yl)methane-1,3 or 4(2)-methyl-1,3-phenylene, and
- G is a monovalent organic radical having 3 to 26 C-atoms, in particular 2-propyl, 3-heptyl, phenyl or a substituted phenyl radical.

Particularly preferred are D for 1,6-hexylene and G is a substituted phenyl radical having 12 to 26 carbon atoms, in particular a phenyl radical which is substituted in para position with an optionally branched decylphenyl, undecylphenyl, dodecylphenyl, tridecylphenyl- or tetradeclyphenyl radical. Such a bis-oxazolidine is liquid and odorless at room temperature, is stable in storage together with isocyanate groups and allows a rapid hardening.

In preferred embodiments, said polyamine BA is an aldimine of formula (I).

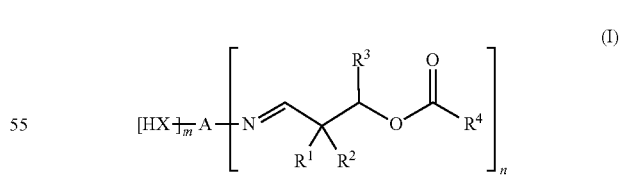

In formula (I), A is the rest of an amine after removal of n primary amino groups and m HX groups; n is 2 or 3 or 4; m is 0 or 1 or 2, with the provisio that m+n is 2 or 3 or 4; $R^1$ and $R^2$ are either each independently a monovalent hydrocarbon radical with 1 to 12 C atoms, or together form a divalent hydrocarbon radical with 4 to 12 C atoms that is part of an optionally substituted carbocyclic ring with 5 to 8, preferably 6, C atoms; $R^3$ is a hydrogen atom or an alkyl-, cycloalkyl-, arylalkyl-, or alkoxycarbonyl radical with 1 to 12 C atoms; $R^4$ is a hydrogen atom or a monovalent radical with 1 to 20 C atoms selected from alkyl-, cycloalkyl-, arylalkyl-, aryl-, —$OR^{5'}$, —$SR^{5'}$, and —$NR^{5'}R^{5'''}$, wherein $R^{5'}$ and $R^{5'''}$ either each independently are hydrocarbon radicals or together form an alkylene radical that is part of a 5-, 6-, or 7-membered ring; and X is O or S or $NR^6$, wherein $R^6$ is a hydrocarbon radical with 1 to 20 C atoms which is optionally substituted with a carbonic acid ester-, nitrile-, nitro-, phosphonic acid ester-, sulphone-, or sulphonic acid ester-group.

Preferably, A is a radical selected from the group consisting of 2-methyl-1,5-pentylene; 1,6-hexylene; 2,2(4),4-trimethyl-1,6-hexamethylene; 1,8-octylene; 1,10-decylene; 1,12-dodecylene; (1,5,5-trimethylcyclohexan-1-yl)methane-1.3; 1,3-cyclohexylene-bis(methylene); 1,4-cyclohexylene-bis(methylene); 1,3-phenylene-bis(methylene); 2- and/or 4-methyl-1,3-cyclohexylene; 3-oxa-1,5-pentylene; 3,6-dioxa-1,8-octylene; 4,7-dioxa-1,10-decylene; α,ω-polyoxypropylene having a molecular weight in the range of 170 to 450 g/mol; and trimethylolpropane-initiated tris(ω-polyoxypropylene) having an average molecular weight in the range of 330 to 450 g/mol.

Particularly preferably, A is 1,6-hexylene; (1,5,5-trimethylcyclohexane-1-yl) methane-1,3; 3-oxa-1,5-pentylene; α,ω-polyoxypropylene having an average molecular weight of about 200 g/mol or trimethylolpropane tris (ω-polyoxypropylene) having an average molecular weight of about 390 g/mol. Most preferably, A is 1,6-hexylene or (1,5,5-trimethylcyclohexane-1-yl)methane-1, 3.

Preferably, $R^1$ and $R^2$ are each methyl.
Preferably, $R^3$ is hydrogen.
$R^4$ is preferably a linear alkyl radical having 11 to 20 C atoms, in particular a linear alkyl radical having 11 C atoms.
These aldimines are low viscosity and virtually odorless before, during, and after hydrolytic activation and crosslinking with isocyanates.
Preferably, m is 0 and n is 2 or 3, especially 2.
In the case where m is 1, n is preferably 1.
In the case where m is 1, X is preferably 0.

An aldimine of the formula (I) is obtainable in particular from the condensation reaction of at least one primary amine of the formula (II) with at least one aldehyde of the formula (III).

$$[HX\text{-}_m\text{-}A\text{-}NH_2]_n \quad \text{(II)}$$

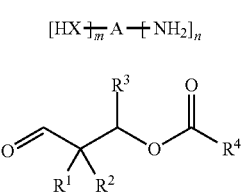
(III)

In formulae (II) und (III), parameters m, n, A, X, $R^1$, $R^2$, $R^3$, and $R^4$ have the same meanings as defined above.

For this condensation reaction, the aldehyde of the formula (III) is preferably used stoichiometrically or more than stoichiometrically based on the primary amino groups of the amine of the formula (II). The reaction is advantageously carried out at a temperature in the range of 15 to 120° C., if appropriate in the presence of a solvent or solvent-free. The released water is preferably removed, for example azeotropically by means of a suitable solvent, or directly from the reaction mixture by applying a vacuum.

Preferred amines of the formula (II) are selected from the group consisting of 1,5-diamino-2-methylpentane, 1,6-hexanediamine, 2,2,4- and 2,4,4-trimethyl-hexamethylene-diamine, 1,8-octanediamine, 1,10-decanediamine, 1,12-dodecanediamine, 1-amino-3-aminomethyl-3,5,5-trimethylcyclohexane, 1,3-bis (aminomethyl) cyclohexane, 1,4-bis (aminomethyl) cyclohexane, 1,3-bis (aminomethyl) benzene, 2- and/or 4-methyl-1,3-diaminocyclohexane, 2-(2-aminoethoxy) ethanol, 3,6-dioxaoctane-1,8 diamine, 4,7-dioxadecane-1,10-diamine and polyoxypropylene amines having an average molecular weight in the range of 200 to 500 g/mol, in particular Jeffamine® D-230, Jeffamine® D-400 and Jeffamine® T-403.

In some preferred embodiments of the moisture-curable composition according to the present inventions, said blocked polyamine BA is a polymeric blocked polyamine PBA that is a polymer having at least two blocked, hydrolytically activatable amino groups.

This means that A in formula (I) is a polymeric rest, preferably a polyether rest. Aldimines of this type can be prepared using amines of formula (II) with a polymeric backbone, in particular polyether backbone. Examples of such amines are polyoxypropylene amines having an average molecular weight in the range of 200 to 500 g/mol, in particular Jeffamine® D-230, Jeffamine® D-400 and Jeffamine® T-403.

The inventive moisture-curable composition preferably comprises at least one filler, preferably in an amount of between 5 and 60 wt.-%, in particular between 25 and 50 wt.-%, based on the total composition.

The term "filler" refers in the present disclosure to solid particulate materials, which are commonly used as fillers in polyurethane-based single-component compositions.

A filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid; barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, titanium dioxide, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

Very preferred as filler for the composition of the invention is chalk (calcium carbonate). Especially preferred is coated or uncoated chalk, as available for example under the name range Omyacarb® (Omya AG, Switzerland) or Socal® (Solvay).

The type and amount of filler is not particularly limited in the present invention. Examples of suitable fillers include calcium carbonate, calcium sulfate and calcium containing minerals such as limestone, calcite, chalk, dolomite, wollastonite, gypsum, apatite, phosphate rock, and mixtures thereof. Preferably, the filler has a median particle size $d_{50}$ in the range of 1.0-100.0 μm, more preferably of 1.0-60.0 μm, most preferably 2.0-50.0 μm.

The term "median particle size $d_{50}$" refers in the present disclosure to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

In preferred embodiments, the composition according to the present invention comprises at least one filler selected from calcium carbonate and/or titanium dioxide and/or carbon black.

It may be advantageous to dry said filler before compounding of the composition, especially since many fillers contain significant amounts of chemisorbed or physisorbed water, which could be detrimental to the storage stability of the composition. However, when using monoamines MA where $R^b$ and $R^c$ together with the N atom of monoamine MA form an aldimine group that under influence of water hydrolyzes to a aldehyde and an amine $R^a$—$NH_2$, drying may be reduced or omitted completely since the aldimine of monoamine MA may act as in situ drying agent by chemically binding water and releasing the free amine of monoamine MA. This embodiment thus has the advantage that less strictly dried fillers or other constituents may be used, which facilitates the raw material storage and compounding process.

The composition according to the present invention may furthermore contain at least one additive, preferably selected from the list consisting of a thixotropy agent, a filler, a plasticizer, a catalyst, and an adhesion promoter.

Suitable catalysts are, in particular, catalysts for the hydrolysis of oxazolidino and/or aldimino groups, in particular organic acids, in particular carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic acid anhydrides such as phthalic anhydride, hexahydrophthalic anhydride or hexahydromethylphthalic anhydride, silyl esters of carboxylic acids, organic sulfonic acids such as methanesulfonic acid, p-toluenesulfonic acid or 4-dodecylbenzenesulfonic acid, sulfonic acid esters, other organic or inorganic acids, or mixtures of the abovementioned acids and acid esters. Particular preference is given to carboxylic acids, in particular aromatic carboxylic acids such as benzoic acid, 2-nitrobenzoic acid or, in particular, salicylic acid.

Further suitable catalysts are catalysts for accelerating the reaction of isocyanate groups, in particular organotin (IV) compounds such as in particular dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complex compounds of bismuth (III) or zirconium (IV), in particular with ligands selected from alcoholates, carboxylates, 1,3-diketonates, oxinate, 1,3-ketoesterates and 1,3-keto-amidates, or compounds containing tertiary amino groups, in particular 2,2' dimorpholinodiethyl ether (DMDEE).

In particular, combinations of different catalysts are also suitable.

In this case, catalysts for accelerating the reaction of isocyanate groups are present in particular only in such an amount that the stability of the cured composition is not excessively impaired.

The composition further optionally contains one or more plasticizers, preferably having at least one ester or ether group.

Suitable plasticizers are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.

Suitable fatty acid esters include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the abovementioned fatty acids, such as are obtainable from the fatty acids or esters thereof by use of processes known to the person skilled in the art.

Particularly suitable plasticizers are carboxylic acid esters, such as phthalates, in particular diisononyl phthalate (DINP), diisodecyl phthalate (DIDP) or di (2-propylheptyl) phthalate (DPHP), hydrogenated phthalates, in particular hydrogenated diisononyl phthalate or diisononyl-1,2-cyclohexanedicarboxylate (DINCH), terephthalates, in particular bis (2-ethylhexyl) terephthalate or diisononyl terephthalate, hydrogenated terephthalates, in particular hydrogenated bis (2-ethylhexyl) terephthalate or diisononyl terephthalate or bis (2-ethylhexyl)-1,4-cyclohexanedicarboxylate, trimellitate, adipate, in particular Dioctyl adipate, azelates, sebacates, benzoates, glycol ethers, glycol esters, organic phosphoric or sulfonic acid esters, poly-butenes, polyisobutenes or plasticizers derived from natural fats or oils, in particular epoxidized soybean or linseed oil.

The one or more plasticizers preferably having at least one ester or ether group can be present if at all in the single-component sealant or adhesive composition with a total amount of 0.5-40.0% by weight, for example 1.0-35% by weight, in particular 10.0-30.0% by weight, based on the total weight of the composition.

The moisture-curable composition may contain other additives, in particular inorganic or organic pigments, in particular titanium dioxide, chromium oxides or iron oxides;

fibers, in particular glass fibers, carbon fibers, metal fibers, ceramic fibers, plastic fibers such as polyamide fibers or polyethylene fibers, or natural fibers such as wool, cellulose, hemp or sisal;

nanofillers such as graphene or carbon nanotubes;

dyes;

drying agents, in particular molecular sieve powders, calcium oxide, highly reactive isocyanates such as p-tosyl isocyanate, mono-oxazolidines such as Incozol®2 (from Incorez) or orthoformic acid esters;

adhesion promoters or agents, in particular organoalkoxysilanes, in particular epoxysilanes such as in particular 3-glycidoxypropyltrimethoxysilane or 3-glycidoxypropyl-triethoxysilane, (meth)acrylosilanes, anhydridosilanes, carbamatosilanes, alkylsilanes or iminosilanes, or oligomeric forms of these silanes, or titanates;

further catalysts which accelerate the reaction of the isocyanate groups, in particular salts, soaps or complexes of tin, zinc, bismuth, iron, aluminum, molybdenum, dioxomolybdenum, titanium, zirconium or potassium, in particular stannous 2-ethylhexanoate, Tin (II) neodecanoate, zinc (II) acetate, zinc (II) 2-ethylhexanoate, zinc (II) laurate, zinc (II) acetylacetonate, aluminum lactate, aluminum oleate, diisopropoxytitanium bis (ethylacetoacetate) or potassium acetate; tertiary amino group-containing compounds, in particular N-ethyldiisopropylamine, N, N, N', N'-tetramethylalkylenediamines, pentamethyl-alkylene-triamines and higher homologs thereof, bis (N, N-diethylaminoethyl) adipate, tris (3-dimethylaminopropyl) amine, 1,4-diazabicyclo [2.2.2] octane (DABCO), 1,8-diazabicyclo [5.4.0] undec-7-ene (DBU), 1,5-diazabicyclo [4.3.0] non-5-ene (DBN), N-alkylmorpholines, N, N'-dimethylpiperazine; nitrogen aromatic compounds such as 4-dimethylaminopyridine, N-methylimidazole, N-vinylimidazole or 1,2-dimethylimidazole; organic ammonium compounds such as benzyltrimethylammonium hydroxide or alkoxylated tertiary amines; so-called "delayed action" catalysts which are modifications of known metal or amine catalysts;

rheology modifiers, in particular thickeners, in particular phyllosilicates, such as bentonites, derivatives of castor oil, hydrogenated castor oil, polyamides, polyamide waxes, polyurethanes, urea compounds, pyrogenic silicic acids, cellulose ethers or hydrophobically modified polyoxyethylenes;

solvents, in particular acetone, methyl acetate, tert-butyl acetate, 1-methoxy-2-propyl acetate, ethyl 3-ethoxypropionate, diisopropyl ether, diethylene glycol diethyl ether, ethylene glycol diethyl ether, ethylene glycol monobutyl ether, ethylene glycol mono-2-ethylhexyl ether, acetals such as propylal, butylal, 2-ethylhexylal, dioxolane, glycerolformal or 2,5,7,10-tetraxoundecane (TOU), toluene, xylene, heptane, octane, naphtha, white spirit, petroleum ether or gasoline, in particular Solvesso™ types (ex Exxon Mobile), and propylene carbonate, dimethyl carbonate, butyrolactone, N-methylpyrrolidone, N-ethylpyrrolidone, p-chlorobenzotrifluoride or benzotrifluoride;

natural resins, fats or oils such as rosin, shellac, linseed oil, castor oil or soybean oil;

non-reactive polymers, in particular homopolymers or copolymers of unsaturated monomers, in particular from the group comprising ethylene, propylene, butylene, isobutylene, isoprene, vinyl acetate or alkyl (meth)acrylates, in particular polyethylenes (PE), polypropylenes (PP), polyisobutylenes, ethylene vinyl acetate copolymers (EVA) or atactic poly-α-olefins (APAO);

flame retardant substances, in particular the already mentioned fillers aluminum hydroxide or magnesium hydroxide, and in particular organic phosphoric acid esters, in particular triethyl phosphate, tricresyl phosphate, triphenyl phosphate, diphenyl cresyl phosphate, isodecyl diphenyl phosphate, tris (1,3-dichloro-2-propyl) phosphate, tris(2-chloroethyl) phosphate, tris(2-ethylhexyl) phosphate, tris (chloroisopropyl) phosphate, tris(chloropropyl) phosphate, isoprylated triphenyl phosphate, mono-, bis- or tris (isopropylphenyl) phosphates of different isopropylation degree, resorcinol bis(diphenyl phosphate), bisphenol A bis (diphenyl phosphate) or ammonium polyphosphates;

additives, in particular wetting agents, leveling agents, defoamers, deaerators, stabilizers against oxidation, heat, light or UV radiation or biocides; or other substances commonly used in moisture-curable compositions.

It may be useful to dry certain substances chemically or physically before mixing into the composition.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are customary preservatives, for example benzisothiazolinone (BIT), methylisothiazolinone (MIT), octylisothiazolinone (OIT), chloromethyl isothiazolinone (CMIT), and the like.

According to one or more embodiments, the total amount of the further additives is preferably 0.1-15.0% by weight, more preferably 0.2-5.0% by weight, based on the total weight of the single-component sealant or adhesive composition.

An especially preferred embodiment of the moisture-curable composition according to the present invention comprises:

between 10 and 40 wt.-%, preferably between 15 and 35 wt.-%, based on the composition, of said polyurethane polymer P having isocyanate groups;

between 1 and 5 wt.-%, preferably between 2 and 4 wt.-%, based on the composition, of said blocked polyamine BA having blocked, hydrolytically activatable amino groups;

between 5 and 40 wt.-%, preferably between 10 and 30 wt.-%, based on the composition, of at least one plasticizer;

between 0 and 40 wt.-%, preferably between 2.5 and 10 wt.-%, based on the composition, of at least one thixotropy additive;

between 0.05 and 2 wt.-%, preferably between 0.1 and 1 wt.-%, based on the composition, of said monoamine MA;

between 0 and 60 wt.-%, preferably between 10 and 50 wt.-%, based on the composition, of at least one filler;

between 0 and 5 wt.-%, preferably between 0.1 and 2.5 wt.-%, based on the composition, of at least one further additive selected from the group consisting of adhesion promoters, drying agents, catalysts, and stabilizers.

The composition according to the present invention can be prepared by mixing the ingredients together at room temperature. Any suitable mixing apparatus can be used for the preparation of the adhesive composition without any special restrictions, except preferably with the exclusion of moisture during compounding.

In particular, the polyurethane composition is produced with the exclusion of moisture and stored at ambient temperature in moisture-tight containers. A suitable moisture-proof container consists in particular of an optionally coated metal and/or plastic and represents in particular a barrel, a container, a bucket, a canister, a can, a bag, a tubular bag, a cartridge or a tube.

The composition, being a one-component composition, is applied as such without the need to mix and begins to harden out under the influence of moisture or water. To accelerate the curing, the composition can however be admixed with an accelerator component which contains or releases water.

Under curing conditions, i.e. in contact with water, the isocyanate groups react with the blocked amino groups under the influence of moisture. A portion of the isocyanate groups, in particular those which are excess relative to the blocked amino groups, react under the influence of moisture with one another and/or with further reactive groups optionally present in the composition, in particular hydroxyl groups or free amino groups. The entirety of these reactions of the isocyanate groups leading to the curing of the composition is also referred to as crosslinking.

The moisture required to cure the moisture-curable composition preferably passes from the air (atmospheric moisture) by diffusion into the composition. At the same time, a solid layer of cured composition ("skin") forms on the air-contacting surfaces of the composition. Curing continues from the outside to the inside along the direction of diffusion, with the skin becoming progressively thicker and eventually encompassing the entire applied composition. The moisture may additionally or completely also originate from one or more substrate(s) to which the composition has been applied, enter into the composition and/or originate from an accelerator component which is admixed with the composition during application or after application is brought into contact with this, for example by brushing or spraying.

The moisture-curable composition is preferably applied at ambient temperature, in particular in the range of about −10 to 50° C., preferably in the range of −5 to 45° C., particularly preferably in the range of 0 to 40° C.

The curing of the moisture-curable composition preferably also takes place at ambient temperature.

The composition according to the present invention has a long processing time (open time) and rapid curing.

"Open time" refers to the period of time during which the composition can be processed or post-processed without loss of functionality. In a one-component composition, the open time is exceeded at the latest when skin has formed. "Curing speed" is the amount of polymer formation in the composition within a given period of time after application, for example, by determining the thickness of the skin formed.

During crosslinking, the aldehyde used to block the amino groups is liberated.

In the case where the aldehyde is largely involatile and odorless, it remains largely in the cured composition and acts as a plasticizer.

Preferably, the moisture-curable composition according to the present invention is used as an elastic adhesive or elastic sealant or elastic coating, in particular a sealant.

As a sealant, the moisture-curable composition is particularly suitable for the elastic sealing of joints, seams or cavities of all kinds, especially joints in construction such as dilation joints or connecting joints between components, or of soil joints in civil engineering. In particular for the sealing of dilatation joints on structures, a sealant with soft elastic properties and high cold flexibility is particularly suitable.

As a coating, the moisture-curable composition is particularly suitable for the protection and/or sealing of structures or parts thereof, in particular for balconies, terraces, roofs, in particular flat roofs or slightly inclined roof or roof gardens, or inside buildings under tiles or ceramic tiles in Wet cells or kitchens, or in drip pans, channels, manholes, silos, docks or sewage treatment plants.

It can also be used for repair purposes as a seal or coating, for example, from leaky roof membranes or no longer suitable floor coverings or as a repair compound for highly reactive spray seals.

The moisture-curable composition may be formulated to have a pasty consistency with pseudoplastic properties. Such a composition is applied by means of a suitable pre-device, for example from commercially available cartridges or buckets or hobbocks, for example in the form of a bead, which may have a substantially round or triangular cross-sectional area.

The moisture-curable composition may further be formulated so that it is liquid and so-called self-leveling or only slightly thixotropic and can be poured out for application. As a coating, for example, it can then be distributed over the entire surface to the desired layer thickness, for example by means of a roller, a slider, a toothed trowel or a spatula. In this case, a layer thickness in the range of 0.5 to 3 mm, in particular 1.0 to 2.5 mm, is typically applied in one operation.

Suitable substrates which can be bonded or sealed or coated with the moisture-curable composition are, in particular glass, glass ceramic, concrete, mortar, cement screed, fiber cement, in particular fiber cement boards, brick, brick, plaster, in particular gypsum boards or anhydrite screed, or natural stones such as granite or marble;

repair or leveling compounds based on PCC (polymer-modified cement mortar) or ECC (epoxy resin-modified cement mortar);

metals or alloys such as aluminum, copper, iron, steel, non-ferrous metals, including surface-refined metals or alloys such as galvanized or chromium-plated metals;

asphalt or bitumen;

leather, textiles, paper, wood, wood-based materials bonded with resins such as phenolic, melamine or epoxy resins, resin-textile composites or other so-called polymer composites;

plastics such as hard and soft PVC, polycarbonate, polystyrene, polyester, polyamide, PMMA, ABS, SAN, epoxy resins, phenolic resins, PUR, POM, TPO, PE, PP, EPM or EPDM, each untreated or surface-treated, for example by means of plasma, corona, or flames;

fiber reinforced plastics such as Carbon Fiber Reinforced Plastics (CFRP), Glass Fiber Reinforced Plastics (GRP) and Sheet Molding Compounds (SMC);

insulating foams, in particular of EPS, XPS, PUR, PIR, rock wool, glass wool or foamed glass (foam glass);

coated or painted substrates, in particular painted tiles, painted concrete, powder-coated metals or alloys or painted sheets;

paints or varnishes, in particular automotive finishes.

If necessary, the substrates can be pretreated prior to application, in particular by physical and/or chemical cleaning methods or the application of an activator or a primer.

Two identical or similar or two different substrates can be bonded and/or sealed.

The single-component composition according to the present invention when intended to be used as an elastic sealant preferably has a Shore A hardness after drying in air during 7 d at 23° C. with a relative humidity of 50% of between 5 and 25, preferably between 9 and 21.

According to another aspect of the present invention, a process for sealing a joint between a substrate S1 and a substrate S2 is provided, the process comprising steps of:
  i) applying a moisture-curable composition according to the description above into a gap between substrate S1 and substrate S2 such that the composition is in contact with both substrates S1 and S2;
  and, subsequently,
  ii) let the applied composition cure by means of humidity, in particular humidity from air;
  wherein the substrate S2 is formed of the same or a different material than the substrate S1.

According to another aspect of the present invention, the use of the moisture-curable composition of the present invention as joint sealant is provided.

Yet another aspect of the present invention is the use of a monoamine MA of formula (V),

(V)

where
R$^a$ represents a linear, cyclic, or branched alkyl or alkenyl radical or optionally substituted aryl radical with 1 to 12 C atoms, preferably 2 to 10 C atoms, more preferably 3 to 8 C atoms, and optionally comprising ether oxygen atoms;
R$^b$ and R$^c$ either independently represent a rest R$^a$ or a hydrogen atom, with the provisio that at least one of R$^b$ and R$^c$ is a hydrogen atom, or R$^b$ and R$^c$ together with the N atom of monoamine BA form an aldimine group that under influence of water hydrolyzes to a aldehyde and an amine R$^a$—NH$_2$;
to reduce the surface tackiness and/or the elastic modulus of a cured moisture-curable composition comprising at least one polyurethane polymer P having isocyanate groups,
wherein
said polymer P is the reaction product of 2,4- and/or 2,6-toluylene diisocyanate (TDI) and at least one polyol, wherein the polyol has an average functionality of >2; and
wherein the amount of said monoamine MA in the composition is between 0.2 and 25 weight parts per 100 weight parts of said polymer P.

In preferred embodiments of said use, R$^b$ and R$^c$ independently represent a rest R$^a$ or a hydrogen atom, with the provisio that at least one of R$^b$ and R$^c$ is a hydrogen atom. All other preferred embodiments for monoamine BA and polymer P are the same as generally discussed further above in the description. Yet another aspect of the present invention is a dried and/or cured single-component sealant or adhesive composition according to the present invention.

EXAMPLES

The invention is further explained in the following experimental part which, however, shall not be construed as limiting to the scope of the invention.
Test Methods The tensile strength, the elongation at break, and the modulus of elasticity at 0.5-25% elongation and 0.5-100% elongation, respectively, were determined according to DIN 53504 (tensile speed: 200 mm/min) on films with a layer thickness of 2 mm, cured for 7 days at 23° C. and 50% relative humidity.

The Shore A hardness was determined according to DIN 53505 on samples with a layer thickness of 6 mm, cured for 7 days at 23° C. and 50% relative humidity.

The surface tackiness (in grams sand adhering to surface) was determined by filling 30 g of the respective sealant composition into a plastic cup, followed by mixing during 1 min in a speedmixer to obtain a smooth surface. The composition was cured during 3 days at 23° C. and 50% relative humidity within the cup. After this, sand was poured onto the exposed surface of the cured sealant and the cup was turned upside down to allow the non-sticking sand to fall off. The adhering portion of sand was determined by weighing using a laboratory balance. The difference in weight of the cup before sand treatment and after sand treatment determined the surface stickiness.
Raw Materials The raw materials and their description regarding important properties which were used for the example sealant compositions are shown in Table 1.

TABLE 1

Raw materials used for the example compositions.

| Raw material | Description |
|---|---|
| Polymer P1 | Polyurethane based on TDI and polyether triol; synthesis see below |
| Polymer P2 | Polyurethane based on TDI and polyether diol and polyether triol; synthesis see below |
| Polymer P3 | Polyurethane based on MDI and polyether triol; synthesis see below |
| Polymer P4 | Polyurethane based on IPDI and polyether diol and polyether triol; synthesis see below |
| Aldimine | Hydrolytically activatable latent amine hardener; synthesis see below |
| Thixotropy agent | Thixotropy paste; synthesis see below |
| DIDP | Diisodecylphthalate (Jayflex™ DIDP, ExxonMobil) |
| Calcium Carbonate | Ground natural calcium carbonate (Omyacarb® 5 GU, Omya) |
| Monoamine MA | Dibutylamine (Sigma Aldrich) |
| Alcohol | Isotridecyl alcohol (Exxal™ 13, ExxonMobil) |
| DBTDL | Dibutyltindilaurate (10 wt.-% in DIDP); tin catalyst |
| Salicylic acid | Salicylic acid (Sigma Aldrich) |

Preparation of Thixotropy Agent, Alidimine, and Polyurethane Polymers Thixotropy Agent The thixotropy agent was prepared by charging 300 g of diisodecyl phthalate and 48 g of 4,4'-diphenylmethane diisocyanate (Desmodur® 44 MC L, from Covestro) in a vacuum mixer, followed by warming up slightly and then, with vigorous stirring, 27 g of monobutylamine were slowly added dropwise. The resulting paste was further stirred under vacuum and external cooling during one hour.

Aldimine: N,N'-Bis(2,2-dimethyl-3-lauroyloxypropyliden)-3-aminomethyl-3,5,5-trimethylcyclohexylamine 598 g (2.1 mol) of 2,2-dimethyl-3-lauroyloxy-propanal were placed in a round-bottomed flask under a nitrogen atmosphere. While stirring, 170.3 g (1 mol) of 3-aminomethyl-3,5,5-trimethylcyclohexylamine (Vestamin®® IPD from Evonik) solution (70 wt.-% in water) was added and then the volatile constituents were removed at 80° C. and under 10 mbar vacuum. 732 g of an almost colorless liquid having an amine content of 2.73 mmol N/g, which corresponds to a calculated equivalent weight of about 367 g/Eq, were obtained.
Preparation of Polymer P1

A polyurethane-based polymer P1 having isocyanate functions was prepared by reacting an ethylene oxide-capped polyoxypropylene triol (Mw 6000 g/mol) under nitrogen with toluene diisocyanate (TDI) in a molar ratio of NCO groups to OH groups of 1.95 at 80° C. by a known polyurethane synthesis process until the reaction was complete. The TDI used was a mixture blend of 80 wt.-% 2,4-toluene diisocyanate and 20 wt.-% 2,6-toluene diisocyanate.
Preparation of Polymer P2

3241 g polyoxypropylene diol (Acclaim® 4200 N, Bayer MaterialScience AG, OH number 28.5 mg KOH/g), 1351 g polyoxypropylene polyoxyethylene triol (Caradol® MD34-

02, Shell Chemicals Ltd., UK, OH number 35.0 mg KOH/g) and 395 g of tolylene diisocyanate (TDI, Desmodur® T 80 P, Bayer MaterialScience AG) were reacted at 80° C. to give an NCO-terminated polyurethane polymer having a content of free isocyanate groups of 1.47% by weight.

Preparation of the Polymer P3

4051 g of polyoxypropylenepolyoxyethylenetriol (Caradol® MD34-02, Shell Chemicals Ltd., UK, OH number 35.0 mg KOH/g), 675 g of 4,4'-methylenediphenyl diisocyanate (4,4'-MDI; Desmodur® 44 MC L, Bayer MaterialScience AG) and 1172 g of diisodecyl phthalate (DIDP, Palatinol® Z, BASF SE, Germany) were reacted by a known method at 80° C. to give an NCO-terminated polyurethane polymer having a content of free isocyanate groups of 2.38% by weight.

Preparation of the Polymer P4

1632 g of polyoxypropylene dial (Acclaim® 4200, from Covestro, OH number 28.5 mg KOH/g), 4410 g polyoxypropylene polyoxyethylene triol (Caradol® MD34-02, from Shell, OH number 35.0 mg KOH/g) and 800 g Isophorone diisocyanate (Vestanat® IPDI, Degussa) were reacted by known method at 80° C. to a liquid (at room temperature) NCO-terminated polyurethane polymer having a content of free isocyanate groups of 2.1% by weight.

TABLE 2

Test formulations (all numbers in weight parts).

| Experiment | E1 | E2 | E3 | R1 (Ref.) | R2 (Ref.) | R3 (Ref.) | R4 (Ref.) | R5 (Ref.) |
|---|---|---|---|---|---|---|---|---|
| Polymer P1 | 25 | 25 | 25 | 25 | 25 | — | — | — |
| Polymer P2 | — | — | — | — | — | — | — | 25 |
| Polymer P3 | — | — | — | — | — | 25 | — | — |
| Polymer P4 | — | — | — | — | — | — | 25 | — |
| Aldimine | 2.8 | 2.8 | 2.8 | 2.8 | 2.8 | 2.8 | 2.8 | 2.8 |
| DIDP | 25 | 25 | 25 | 25 | 25 | 25 | 25 | 25 |
| Thixotropy agent | 5.47 | 5.47 | 5.47 | 5.47 | 5.47 | 5.47 | 5.47 | 5.47 |
| Calcium Carbonate | 41.6 | 41.4 | 41.2 | 41.2 | 41.7 | 41.7 | 41.7 | 41.7 |
| Monoamine MA | 0.1 | 0.3 | 0.5 | — | — | — | — | — |
| Alcohol | — | — | — | 0.5 | — | — | — | — |
| DBTDL | 0.01 | 0.01 | 0.01 | 0.01 | 0.01 | 0.01 | 0.01 | 0.01 |
| Salicylic acid | 0.02 | 0.02 | 0.02 | 0.02 | 0.02 | 0.02 | 0.02 | 0.02 |
| TOTAL | 100 | 100 | 100 | 100 | 100 | 100 | 100 | 100 |

Example Compositions E1 to E3 and R1 to R5

For each composition, the ingredients shown in Table 1 were mixed well in the indicated amounts (in parts by weight) in Table 2 by means of a planetary mixer under vacuum and with exclusion of moisture and stored under exclusion of moisture. Several non-inventive reference (denoted "Ref.") and inventive example compositions were made from the raw materials in Table 1 using the respective amounts as shown in Table 2.

Test Results

The results of the test methods used on each example composition are detailed in Table 3.

TABLE 3

Test results (mechanical tests, surface tackiness, Shore A hardness).

| Test method [unit] | E1 | E2 | E3 | R1 (Ref.) | R2 (Ref.) | R3 (Ref.) | R4 (Ref.) | R5 (Ref.) |
|---|---|---|---|---|---|---|---|---|
| Surface tackiness [g] | 5.05 | 5.84 | 6.86 | 8.90 | 5.08 | 2.12 | 7.37 | 9.61 |
| Tensile strength [MPa] | 2.43 | 2.09 | 1.33 | 1.35 | 2.24 | 1.48 | 2.75 | 1.79 |
| Elongation at break [%] | 1001 | 1058 | 1213 | 1381 | 874 | 509 | 962 | 1263 |
| E-modulus 0.5-25% [MPa] | 0.68 | 0.51 | 0.33 | 0.33 | 0.87 | 1.33 | 0.70 | 0.32 |
| E-modulus 0.5-100% [MPa] | 0.34 | 0.25 | 0.16 | 0.20 | 0.41 | 0.53 | 0.32 | 0.14 |
| Shore A [—] | 21 | 15 | 9 | 11 | 26 | 29 | 22 | 11 |

The results of Table 3 show that the inventive sealant compositions E1 to E3 show low elastic modulus of <0.7 MPa in the range of 0.5-25% elongation and <0.35 MPa in the range of 0.5-100% elongation, while at the same time only exhibiting low to moderate surface tackiness. Without monoamine MA in the otherwise same composition (R1), surface tackiness in significantly increased.

The same is true when another TDI-based polymer P is used without monoamine MA (R5). Using an alcohol instead (R2), surface tackiness is low, but the elastic modulus increases significantly and reduces suitability for an elastic sealant. Other reference examples using different polyisocyanates for polymer P (R3 and R4) exhibit too high modulus and/or too high surface tackiness for the intended use as elastic sealant.

The invention claimed is:

1. A moisture-curable composition comprising
   a) at least one polyurethane polymer P having isocyanate groups;
   b) at least one blocked polyamine BA having blocked, hydrolytically activatable amino groups; and
   c) at least one monoamine MA of formula (V),

(V)

where
   $R^a$ represents a linear, cyclic, or branched alkyl or alkenyl radical or optionally substituted aryl radical with 1 to 12 C atoms and optionally comprising ether oxygen atoms;
   $R^b$ and $R^c$ either independently represent a rest $R^a$ or a hydrogen atom, with the provisio that at least one of $R^b$ and $R^c$ is a hydrogen atom, or $R^b$ and $R^c$ together with the N atom of monoamine MA form an aldimine group that under influence of water hydrolyzes to a aldehyde and an amine $R^a$—$NH_2$;
   wherein polymer P is the reaction product of 2,4- and/or 2,6-toluylene diisocyanate (TDI) and at least one polyol, wherein the polyol has an average functionality of >2; and
   wherein the amount of said monoamine MA in the composition is between 0.2 and 25 weight parts per 100 weight parts of said polymer P.

2. The moisture-curable composition according to claim 1, wherein $R^b$ and $R^c$ independently represent a rest $R^a$ or a hydrogen atom, with the provisio that at least one of $R^b$ and $R^c$ is a hydrogen atom.

3. The moisture-curable composition according to claim 2, wherein $R^b$ is a rest $R^a$ and $R^c$ is a hydrogen atom.

4. The moisture-curable composition according to claim 1, wherein $R^b$ and $R^c$ together with the N atom of monoamine MA form an aldimine group that under influence of water hydrolyzes to a aldehyde and an amine $R^a$—$NH_2$.

5. The moisture-curable composition according to claim 1, wherein the blocked polyamine BA and the polymer P having isocyanate groups are present in the curable composition in such an amount that the ratio between the blocked amino groups and the isocyanate groups is from 0.1 to 1.1.

6. The moisture-curable composition according to claim 1, wherein the blocked polyamine BA is an aldimine of the formula (I),

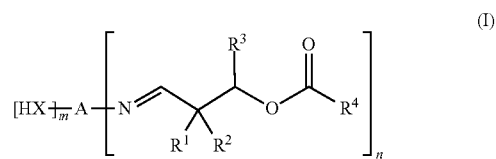

(I)

where
   A is the rest of an amine after removal of n primary amino groups and m HX groups;
   n is 2 or 3 or 4;
   m is 0 or 1 or 2, with the provisio that m+n is 2 or 3 or 4;
   $R^1$ and $R^2$ are either each independently a monovalent hydrocarbon radical with 1 to 12 C atoms, or together form a divalent hydrocarbon radical with 4 to 12 C atoms that is part of an optionally substituted carbocyclic ring with 5 to 8 C atoms;
   $R^3$ is a hydrogen atom or an alkyl-, cycloalkyl-, arylalkyl-, or alkoxycarbonyl radical with 1 to 12 C atoms;
   $R^4$ is a hydrogen atom or a monovalent radical with 1 to 20 C atoms selected from alkyl-, cycloalkyl-, arylalkyl-, aryl-, —$OR^{5'}$, —$SR^{5'}$, and —$NR^{5'}R^{5''}$, wherein $R^{5'}$ and $R^{5''}$ either each independently are hydrocarbon radicals or together form an alkylene radical that is part of a 5-, 6-, or 7-membered ring; and
   X is O or S or $NR^6$, wherein $R^6$ is a hydrocarbon radical with 1 to 20 C atoms which is optionally substituted with a carbonic acid ester-, nitrile-, nitro-, phosphonic acid ester-, sulphone-, or sulphonic acid ester-group.

7. The moisture-curable composition according to claim 6, wherein $R^1$ and $R^2$ are each methyl and/or $R^3$ is a hydrogen atom and/or $R^4$ is a linear alkyl radical having 11 to 20 C atoms.

8. The curable composition according to claim 6, wherein m is 0 and n is 2 or 3.

9. The moisture-curable composition according to claim 1, wherein the blocked polyamine BA is a polymeric blocked polyamine PBA that is a polymer having at least two blocked, hydrolytically activatable amino groups.

10. The moisture-curable composition according to claim 1, wherein the polyol used for the synthesis of polymer P has an average OH-functionality of between 2.1 and 3.5 and/or said polymer P is prepared from said polyol and TDI using a molar ratio of NCO groups to OH groups of between 1.8 and 2.2.

11. The moisture-curable composition according to claim 1, wherein the composition comprises:
   between 10 and 40 wt.-% based on the composition, of said polyurethane polymer P having isocyanate groups;
   between 1 and 5 wt.-% based on the composition, of said blocked polyamine BA having blocked, hydrolytically activatable amino groups;
   between 5 and 40 wt.-% based on the composition, of at least one plasticizer;
   between 0 and 40 wt.-% based on the composition, of at least one thixotropy additive;
   between 0.05 and 2 wt.-% based on the composition, of said monoamine MA;
   between 0 and 60 wt.-% based on the composition, of at least one filler; and between 0 and 5 wt.-% based on the composition, of at least one further additive selected from the group consisting of adhesion promoters, drying agents, catalysts, and stabilizers.

12. A process for sealing a joint between a substrate S1 and a substrate S2, comprising the steps of:
   i) applying a moisture-curable composition according to claim 1 into a gap between substrate S1 and substrate S2 such that the composition is in contact with both substrates S1 and S2;
   and, subsequently,
   ii) let the applied composition cure by means of humidity; wherein the substrate S2 is formed of the same or a different material than the substrate S1.

13. A method comprising: applying the moisture-curable composition according to claim 1 to a surface of a substrate and curing the composition to form a structure in which the cured composition is configured as a joint sealant.

14. A method comprising: introducing a monoamine MA of formula (V),

(V)

into a moisture-curable composition comprising at least one polyurethane polymer P having isocyanate groups and at least one blocked polyamine BA having blocked, hydrolytically activatable amino groups, to form a mixture, the monoamine MA of formula (V) being present in the mixture in an amount effective to reduce the surface tackiness and/or the elastic modulus of a cured form of the mixture, and curing the mixture to form a cured product with reduced surface tackiness and/or elastic modulus relative to a corresponding cured product prepared in an identical manner but without the monoamine MA of formula (V),
where
   $R^a$ represents a linear, cyclic, or branched alkyl or alkenyl radical or optionally substituted aryl radical with 1 to 12 C atoms and optionally comprising ether oxygen atoms;
   $R^b$ and $R^c$ either independently represent a rest $R^a$ or a hydrogen atom, with the proviso that at least one of $R^b$ and $R^c$ is a hydrogen atom, or $R^b$ and $R^c$ together with the N atom of monoamine MA form an aldimine group that under influence of water hydrolyzes to a aldehyde and an amine $R^a$—$NH_2$;
wherein
   said polymer P is the reaction product of 2,4- and/or 2,6-toluylene diisocyanate (TDI) and at least one polyol, wherein the polyol has an average functionality of >2; and
   wherein the amount of said monoamine MA in the composition is between 0.2 and 25 weight parts per 100 weight parts of said polymer P.

15. The method according to claim 14, wherein $R^b$ and $R^c$ independently represent a rest $R^a$ or a hydrogen atom, with the proviso that at least one of $R^b$ and $R^c$ is a hydrogen atom.

16. A process for sealing a joint between a substrate S1 and a substrate S2, comprising the steps of:
   i) applying a moisture-curable composition according to claim 11 into a gap between substrate S1 and substrate S2 such that the composition is in contact with both substrates S1 and S2;
   and, subsequently,
   ii) let the applied composition cure by means of humidity; wherein the substrate S2 is formed of the same or a different material than the substrate S1.

* * * * *